(12) United States Patent
Ohara

(10) Patent No.: US 9,264,291 B2
(45) Date of Patent: Feb. 16, 2016

(54) PRINTER SEARCHING DEVICE

(75) Inventor: Kiyotaka Ohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/072,760

(22) Filed: Mar. 27, 2011

(65) Prior Publication Data

US 2011/0242599 A1 Oct. 6, 2011

(30) Foreign Application Priority Data

Mar. 31, 2010 (JP) ................................. 2010-080157

(51) Int. Cl.
| | |
|---|---|
| *G06F 3/12* | (2006.01) |
| *H04L 29/12* | (2006.01) |
| *H04L 29/06* | (2006.01) |

(52) U.S. Cl.
CPC .... *H04L 29/12113* (2013.01); *H04L 29/12933* (2013.01); *H04L 61/1541* (2013.01); *H04L 61/6068* (2013.01); *H04L 63/10* (2013.01)

(58) Field of Classification Search
CPC combination set(s) only.
See application file for complete search history.

(56) References Cited

U.S. PATENT DOCUMENTS

| | | | |
|---|---|---|---|
| 7,010,695 | B1 | 3/2006 | Mizuguchi |
| 2005/0071683 | A1 | 3/2005 | Mizuguchi |
| 2005/0105130 | A1 | 5/2005 | Hagiuda |
| 2005/0216602 | A1* | 9/2005 | Armstrong et al. ........... 709/250 |
| 2006/0203282 | A1* | 9/2006 | Iwai .............................. 358/1.15 |
| 2006/0221863 | A1* | 10/2006 | Ishimoto et al. .............. 370/254 |
| 2007/0206514 | A1* | 9/2007 | Onishi .......................... 370/254 |
| 2008/0130047 | A1* | 6/2008 | Shudo .......................... 358/1.15 |
| 2009/0323688 | A1* | 12/2009 | Torii ............................. 370/390 |
| 2010/0257271 | A1* | 10/2010 | Nakamura et al. ........... 709/226 |
| 2011/0022632 | A1* | 1/2011 | Kishimoto .................... 707/770 |

FOREIGN PATENT DOCUMENTS

| | | |
|---|---|---|
| CN | 1466066 A | 1/2004 |
| EP | 1517508 A2 | 3/2005 |
| JP | 2004-110587 A | 4/2004 |
| JP | 2005-149094 A | 6/2005 |
| JP | 2006-301999 A | 11/2006 |

(Continued)

OTHER PUBLICATIONS

European Patent Office, extended European Search Report for European Patent Application No. 11156647.7 (counterpart to above-captioned patent application), dated Aug. 18, 2011.

(Continued)

*Primary Examiner* — Tammy Pham
*Assistant Examiner* — Idowu O Osifade
(74) *Attorney, Agent, or Firm* — Baker Botts L.L.P.

(57) ABSTRACT

A printer searching device may comprise a first acquiring unit, a second acquiring unit, a searching unit, and a providing unit. The first acquiring unit may acquire a plurality of a first kind of global IP addresses that is allotted to a plurality of printers and register the plurality of the first kind of global IP addresses to a memory. The second acquiring unit may acquire a second kind of global IP address that is allotted to the terminal device. The searching unit may search, from the plurality of printers, one or more printers to which a value that is identical to a value of a network address part of the second kind of global IP address is allotted as a value of a network address part of the first kind of global IP address. The providing unit may provide a search result to the terminal device.

18 Claims, 10 Drawing Sheets

Printer Information Table 26

| | Printer ID | Printer Name | Model Name | Global IP | Private IP | Subnet Mask | Location |
|---|---|---|---|---|---|---|---|
| 390→ | PIDX (Printer 70) | P1 | M1 | 133.152.0.1 | 192.168.0.1 | 255.255.255.0 | 5th floor |
| 392→ | PIDY1 (Printer 80) | P2 | M2 | 133.152.0.2 | 192.168.1.1 | 255.255.255.0 | 4th floor |
| 394→ | PIDY2 (Printer 82) | P3 | M3 | 133.152.0.2 | 192.168.1.2 | 255.255.255.0 | 4th floor |
| 396→ | PIDZ1 (Printer 90) | P4 | M4 | 201.57.37.1 | 192.168.2.1 | 255.255.255.0 | 3th floor |
| 398→ | PIDZ2 (Printer 92) | P5 | M5 | 201.57.37.1 | 192.168.2.2 | 255.255.255.0 | 3th floor |

370  372  374  376  378  380  382

(56) References Cited

FOREIGN PATENT DOCUMENTS

| JP | 2007-133887 A | 5/2007 |
| JP | 2008-158856 A | 7/2008 |
| JP | 2008-250972 A | 10/2008 |
| JP | 2009-140030 A | 6/2009 |
| WO | 2009/116265 A1 | 9/2009 |

OTHER PUBLICATIONS

Japan Patent Office, Notification of Reasons for Rejection for Japanese Patent Application No. 2010-080157 (counterpart Japanese patent application), mailed Jul. 3, 2012.
European Patent Office, Office Action for European Patent Application No. 11156647.7 (counterpart to above-captioned patent application), dated May 23, 2012.
Japan Patent Office, Notification of Reasons for Rejection for Japanese Patent Application No. 2010-080157 (counterpart Japanese patent application), mailed Mar. 5, 2013.
State Intellectual Property Office of the People's Republic of China, Notification of First Office Action for Chinese Patent Application No. 201110079943.4 (counterpart to above-captioned patent application), mailed Jun. 3, 2013.
European Patent Office, Office Action for European Patent Application No. 11156647.7 (counterpart to above-captioned patent application), mailed Nov. 11, 2013.
Citrix Consulting, Proximity Printing, May 18, 2005, pp. 1-3, XP055086852.
State Intellectual Property Office of the People's Republic of China, Notification of the Second Office Action for Chinese Patent Application No. 201110079943.4 (counterpart to above-captioned patent application), mailed Apr. 17, 2014.
European Office Action, Office Action for European Patent Application No. 11156647.7, foreign counterpart to above-captioned patent application, mailed Nov. 17, 2014.
State Intellectual Property Office of the People's Republic of China, Notification of Third Office Action issued for Chinese Patent Application No. 201110079943.4 (foreign counterpart to above-captioned patent application), mailed Dec. 22, 2014.

* cited by examiner

FIG. 6

Address Permission Table 22

| Global IP Address | Permission Level |
|---|---|
| 133.151.0.1 | 5 |
| 133.152.0.1 (NAT Router 50) | 3 |
| 133.152.0.2 (NAT Router 52) | 3 |
| 133.155.0.1 | 4 |
| 201.57.37.1 (NAT Router 54) | 2 |
| 201.57.99.1 | 1 |
| Not Registered | 1 |

FIG. 7

Printer Permission Table 24

| Printer ID | Permission Level |
|---|---|
| 87652897 | 5 |
| 456456 | 4 |
| 756868 | 3 |
| 56456456 | 2 |
| 45987263948 | 1 |
| Not Registered | 1 |

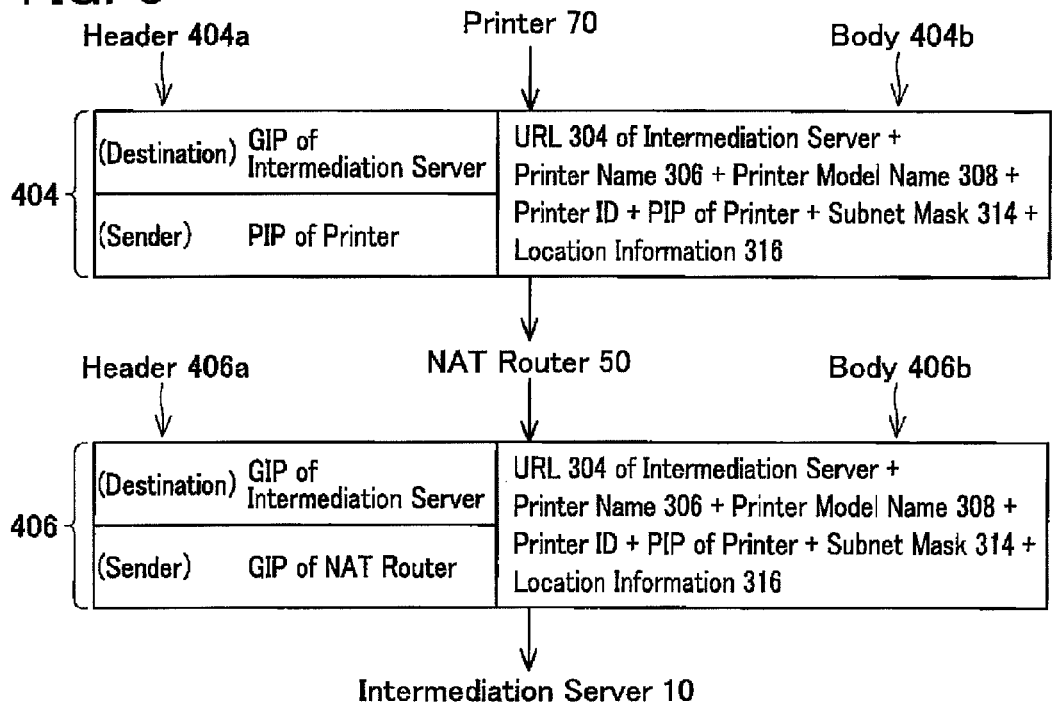

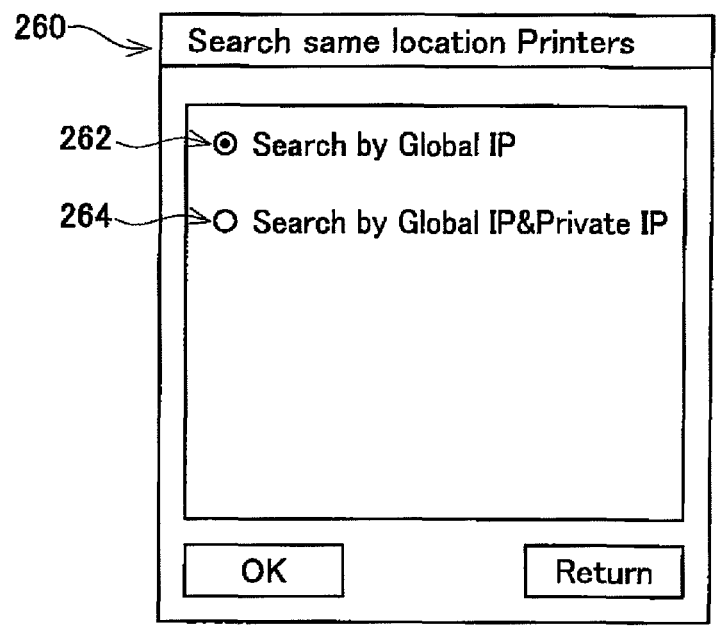

PRINTER SEARCHING DEVICE

CROSS-REFERENCE TO RELATED APPLICATIONS

This application claims priority to Japanese Patent Application No. 2010-80157, filed on Mar. 31, 2010, the contents of which are hereby incorporated by reference into the present application.

TECHNICAL FIELD

The technology disclosed in the present specification relates to a printer searching device for searching a printer that is capable of being utilized by a terminal device.

DESCRIPTION OF THE RELATED ART

There is known a system in which an information terminal, a plurality of printers, and a printer searching server are connected with each other via the Internet. An administrator of the system registers, into the printer searching server in advance, an address indicating a place in which each printer is located. A user of the information terminal inputs to the information terminal an address of a current place in which the information terminal is located. The information terminal supplies the input address of the information terminal to the printer searching server. The printer searching server searches, from the plurality of printers, a printer having an address close to the address of the information terminal supplied from the information terminal. The printer searching server provides a search result of the printer to the information terminal. In this manner, the printer searching server can provide information concerning the printer existing in the vicinity of the information terminal to the information terminal.

SUMMARY

Disclosed herein is a technology alternative to the above for providing information concerning a printer existing in the vicinity of a terminal device to the terminal device.

One aspect of techniques disclosed herein is a printer searching device for searching a printer that is capable of being utilized by a terminal device. The printer searching device may comprise a first acquiring unit, a second acquiring unit, a searching unit, and a providing unit. The first acquiring unit may be configured to acquire a plurality of a first kind of global IP addresses that is allotted to a plurality of printers and register the plurality of the first kind of global IP addresses to a memory. The second acquiring unit may be configured to acquire a second kind of global IP address that is allotted to the terminal device. The searching unit may be configured to search, from the plurality of printers, one or more printers to which a value that is identical to a value of a network address part of the second kind of global IP address is allotted as a value of a network address part of the first kind of global IP address. The providing unit may be configured to provide a search result of the one or more printers to the terminal device.

Another aspect of techniques disclosed herein is a printing intermediation server configured to be connected with the terminal device via a network. The printing intermediation server may comprise the printer searching device, a model information acquiring unit, a print data creation unit, and a print data supplying unit. The model information acquiring unit may be configured to acquire model information indicating a model of a specific printer selected from the one or more printers by the terminal device. The print data creation unit may be configured to create, based on the model information, print data that the specific printer is capable of interpreting. The print data supplying unit may be configured to supply the print data to the specific printer.

Note that a control method and a computer program for realizing the printer searching device, and a non-transitory computer readable medium for storing the computer program are also novel and useful. A system having the printer searching device and the terminal device is novel and useful as well.

BRIEF DESCRIPTION OF THE DRAWINGS

FIG. 6 shows an example of the configuration of an address permission table;
FIG. 7 shows an example of the configuration of a printer permission table;
FIG. 8 shows an example of printer information sent by a printer;
FIG. 9 shows an example of the configuration of a printer information table;
FIG. 15 shows an example of a search condition setting screen;
and
FIG. 16 shows an example of a printer select screen.

DETAILED DESCRIPTION OF THE PREFERRED EMBODIMENTS

First Embodiment

System Configuration

Figure 1:
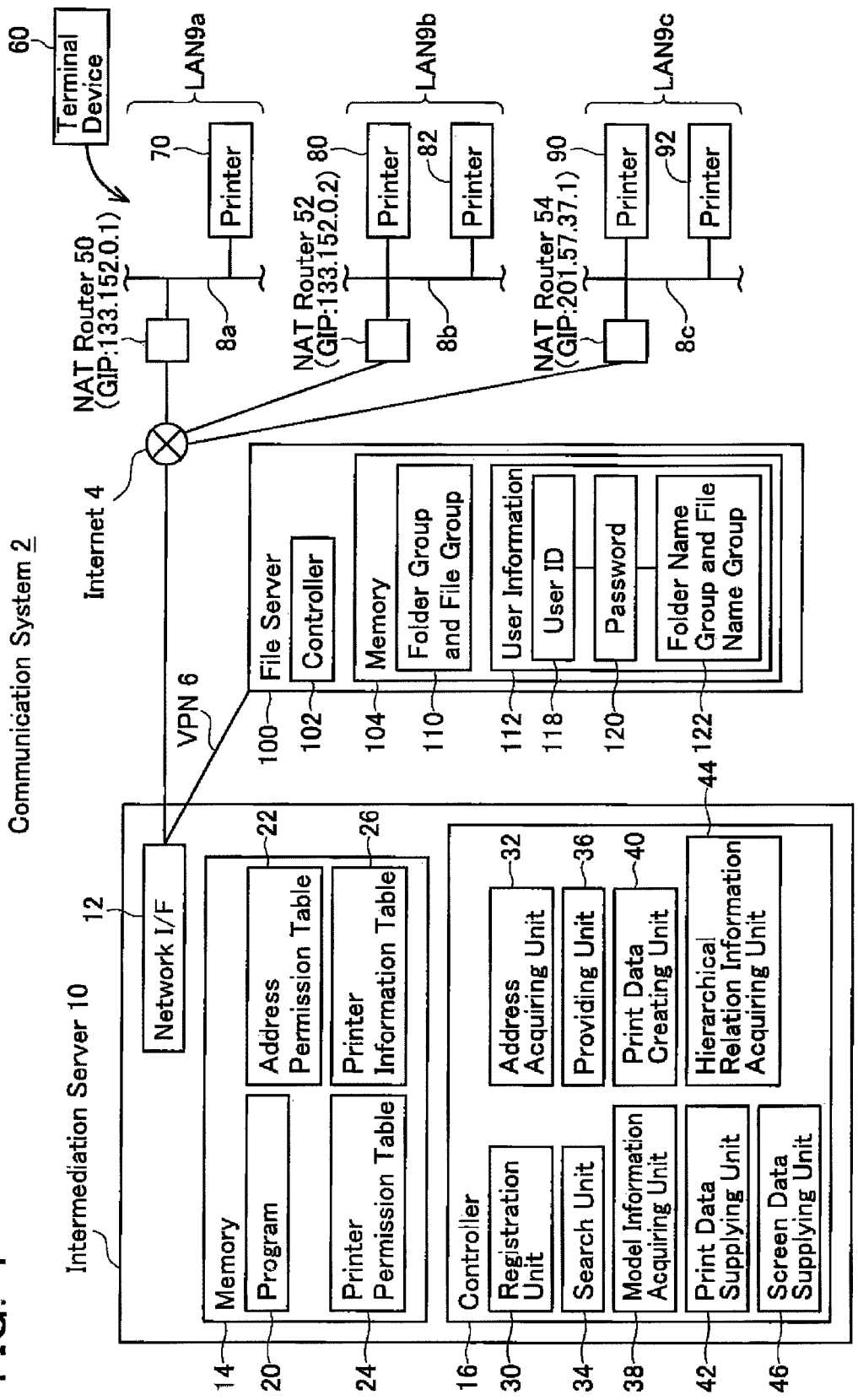
FIG. 1 shows an example of the configuration of a communication system.

As shown in FIG. 1, a communication system 2 comprises an intermediation server 10, NAT (Network Address Translation) routers 50, 52 and 54, portable terminal device 60, and file server 100. The intermediation server 10 and each of the NAT routers 50 to 54 are connected to the Internet 4. The intermediation server 10 and each of the NAT routers 50 to 54 are capable of communicating with each other via the Internet 4. Furthermore, the intermediation server 10 and the file server 100 are connected to a VPN (Virtual Private Network) 6. The intermediation server 10 and the file server 100 are capable of communicating with each other via the VPN 6. The VPN 6 is an exclusive line for allowing the communication between the intermediation server 10 and the file server 100.

In assuming that an Internet 4 side on each of the NAT routers 50, 52 and 54 is supposedly an upstream side, LANs 9a, 9b and 9c are formed on a downstream side of the NAT routers 50, 52 and 54. The LAN 9a includes the NAT router 50, a communication cable 8a, and a printer 70. Similarly, the LAN 9b includes the NAT router 52, a communication cable 8b, and printers 80 and 82. The LAN 9c includes the NAT router 54, a communication cable 8c, and printers 90 and 92. Note that the terminal device 60 is a portable terminal device, such as a PC, and can be connected to any of the LANs 9a, 9b and 9c. In the present embodiment, the terminal device 60 is normally used by being connected to a specific LAN (not shown) having the file server 100. FIG. 1 shows a state in which the terminal device 60 is connected to the LAN 9a from outside of the specific LAN to which the terminal 60 is normally connected. In a state in which the terminal device 60 is connected to the LAN 9a, the terminal device 60 and the intermediation server 10 are connected to each other via the Internet 4 and the LAN 9a. The terminal device 60 and the intermediation server 10 are capable of communicating with each other via the Internet 4 and the LAN 9a.

(Configuration of the Intermediation Server 10)

The intermediation server 10 comprises a network interface 12, memory 14, and controller 16. The network interface 12 is connected to the Internet 4 and the VPN 6. The memory 14 stores a program 20, address permission table 22 (see FIG. 6), printer permission table 24 (see FIG. 7), and printer information table 26 (see FIG. 9). The controller 16 executes various processes in accordance with the program 20 in the memory 14. The respective functions of units 30 to 46 are realized as a result of the controller 16 executing processes according to the program 20.

(Configuration of the LAN 9a)

The NAT router 50 functions to relay the communication between a WAN side (Internet 4 side) and a LAN 9a side. Specifically, when a device within the LAN 9a (the printer 70, for example) communicates with the WAN side, the NAT router 50 allots a global IP address to the device. In other words, when the device within the LAN 9a communicates with the WAN side, the NAT router 50 changes a sender IP address within a packet sent from the device, from a private IP address of the device to the global IP address (this will be described later). The NAT router 50 can allot a predetermined global IP address, which is "133.152.0.1" in the present embodiment. Note that the global IP address "133.152.0.1" that can be allotted by the NAT router 50 is simply called the "global IP address of the NAT router 50" hereinafter.

Classes of global IP addresses are now described. The value of a class A global IP address is any value within a range of "0.0.0.0" to "127.255.255.255." The value of a class B global IP address is any value within a range of "128.0.0.0" to "191.255.255.255." The value of a class C global IP address is any value within a range of "192.0.0.0" to "223.255.255.255." The first 8 bits, 16 bits, and 24 bits of the global IP addresses of the respective classes A, B and C are network address parts. For example, the global IP address of the NAT router 50 "133.152.0.1" belongs to the class B. Therefore, the first 16-bit value "133.152" is the value of the network address part.

Furthermore, in the NAT router 50, private IP addresses for communicating with the other devices 60, 70 within the LAN 9a (i.e., gateway addresses) are set beforehand. Similarly, the other devices 60, 70 within the LAN 9a are also allotted private IP addresses. The value of the network address part of the private IP address is identical among the NAT router 50, terminal device 60 and printer 70 configuring the same LAN 9a. Specifically, subnet masks having the same value are utilized in these devices 50, 60 and 70.

The printer 70 is a device (peripheral equipment) having a print function. Note that the printer 70 may be a multifunctional device that has a scanner function, copy function, FAX function and telephone function, in addition to the print function.

(Configurations of LANs 9B and 9C)

The NAT router 52 configuring the LAN 9b and the NAT router 54 configuring the LAN 9c have the same function as the NAT router 52 described above. A global IP address that can be allotted by the NAT router 52 (a global IP address of the NAT router 52) is "133.152.0.2," which belongs to the class B. Therefore, the first 16-bit value "133.152" is the value of the network address part. The value of the network address part of the global IP address of the NAT router 50 is identical to the value of the network address part of the global IP address of the NAT router 52. Therefore, from the perspective of the global IF addresses, the LAN 9a and the LAN 9b configure the same subnet. However, the LAN 9a and the LAN 9b are different local networks as they are not connected to each other by the same local line. Specifically, the device configuring the LAN 9a and the device configuring the LAN 9b need to communicate with each other via the Internet 4.

In addition, a global IP address that can be allotted by the NAT router 54 (the global IP address of the NAT router 54) is "201.57.37.1," which belongs to the class C. Therefore, the first 24-bit value "201.57.37" is the value of the network address part. The value of the network address part of the global IP address of the NAT router 54 is different from the value of the network address parts of the global IP address of the NAT routers 50 and 52.

Similar to the case of the LAN 9a, the devices 52, 54, 80, 82, 90 and 92 configuring the LAN 9b and the LAN 9c are also allotted the private IP addresses. Note that the value of the network address part of the private IP address is identical among the devices 52, 80 and 82 configuring the LAN 9b. The value of the network address part of the private IP address is identical among the devices 54, 90 and 92 configuring the LAN 9c. Note that the printers 80, 82, 90 and 92 have the same function as the printer 70.

(Configuration of the File Server 100)

The file server 100 is, for example, a server utilized in a specific company. The file server 100 comprises a controller 102 and memory 104. The controller 102 executes various processes in accordance with a program (not shown) within the memory 104. A folder group and file group 110 (see FIG. 5) are stored in the memory 104. User information 112 is also stored in the memory 104. The user information 112 is information related to, for each of a plurality of users using the file server 100, an association of a user ID 118 of the user, password 120 of the user, and folder name group and file name group 122 corresponding to the folder group and file group accessible (readable, browsable) by the user. The folder name group and file name group 122 correspond to the folder group and file group accessible by the user when the user uses the terminal device 60 or the like to access the file server 100 directly via the LAN (not shown) having the file server 100, without using the Internet 4. As described hereinafter, when a user uses the terminal device 60 or the like from the outside of the LAN to which the terminal 60 is normally connected, in order to indirectly access the file server 100 by using the Internet 4, the user might not be able to access the entire folder group and file group corresponding to the folder name group and file name group 122 for the user. An administrator of the file server 100 registers the user information 112 of each employee of the specific company to the memory 104 in advance.

Figure 5:
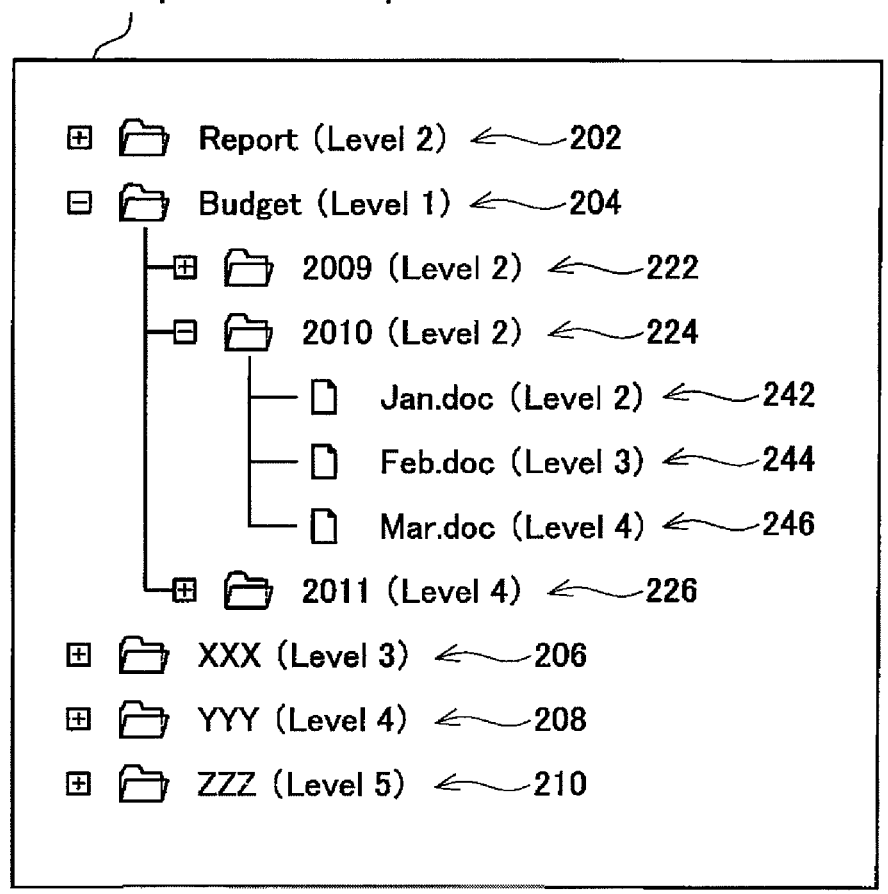
FIG. 5 shows an example of the configurations of a folder group and file group stored in a file server.

As shown in FIG. 5, the folder group and file group 110 include a plurality of folders 202 to 210 and 222 to 226, as well as a plurality of files 242 to 246. The plurality of folders 202 to 210 and 222 to 226 and the plurality of files 242 to 246 are in a hierarchy. Specifically, five folders 202 to 210 are stored as the highest folder group in the memory 104. The highest folder 204 (with a folder name "Budget") has three folders 222 to 226 stored therein (that is, the folders 222 to 226 are lower folders under the folder 204). Also, the folder 224 has three files 242 to 246 stored therein (that is, the files 242 to 246 are lower files under the folder 224). Similarly, the other highest folders 202, 206 and the like have lower folders and lower files stored therein.

Secret levels for each folder and each file are related to the each folder and each file. For example, a secret level "2" is related to the highest folder 202 (with a folder name "Report"). Similarly, for instance, a secret level "3" is related to the file 244 (with a file name "Feb.doc"). The administrator of the file server 100 sets the secret levels for each folder and each file in advance. Note that the larger the numerical value of the secret level of a folder or file is, the higher the security (confidentiality) of the folder or file is. The highest value of the secret level is "5" and the lowest value is "1." Although not shown, permission GIP information 400 and permission PID information 402 are also stored in the memory 104 of the file server 100. The administrator of the file server 100 registers the permission GIP information 400 and the permission PID information 402 into the memory 104 in advance.

(Processes Executed by the Devices)

Subsequently, With reference to FIGS. 2 and 3, the details of processes executed by the devices of the communication system 2 are described. The global IP addresses are often abbreviated to "GIP," the private IP addresses to "PIP," and a printer ID to "PID" hereinafter.

The file server 100 sends the permission global IP address information (permission GIP information) 400 and the permission printer ID information (permission PID information) 402 to the intermediation server 10 periodically. The permission GIP information 400 includes, for each of the plurality of NAT routers, the GIP of each NAT router and the levels of the folder group and file group 110 (access permission levels) that can be accessed from the terminal devices provided in the LAN with the GIP. The permission PID information 402 includes, for each of a plurality of printers, the printer ID for identifying a printer and the levels of files that can be printed by the printer (print permission levels).

As described above, the permission GIP information 400 includes, for each of the plurality of NAT routers including the NAT routers 50, 52 and 54, the GIP of each of the NAT routers and the access permission level of the folder group and file group 110 with respect to the GIP. Specifically, for each location (area) of the LANs represented by the GIPs, the permission GIP information 400 differentiates the folder group and file group 110 that can be accessed. When the controller 16 of the intermediation server 10 (see FIG. 1) receives the permission GIP information 400 from the file server 100, the controller 16 registers each of information included in the permission GIP information 400 into the address permission table 22 of the memory 14 (see FIGS. 1 and 6) (S2).

As shown in FIG. 6, the address permission table 22 includes a plurality of combination information 136 to 146. Each of the combination information 136 to 146 is information with which a global IP address (GIP) 130 and a permission level 134 for accessing the folders and files are related. Note that the permission level 134 for the GIP indicates the highest level of the secret levels of the folders and files that is permitted to be accessed by the users of the devices that are allotted the GIPs. For example, the permission level of the GIP of the NAT router 50 that is included in the combination information 138 is "3." In this example, the user of the device that is allotted the GIP of the NAT router 50 (e.g., the terminal device 60) is permitted to access the folder group and file group having the secret level of "3" or lower and is prohibited from accessing the folder group and file group having the secret level of "4" or higher.

Note that, as shown in FIG. 6, combination information 148 is registered in the address permission table 22. The combination information 148 shows that the permission level of the GIP that is not registered in the address permission table 22 is "1." Specifically, the user of the device that is allotted the GIP that is not registered in the address permission table 22 is permitted to access only the folder group and file group having the secret level of "1." Note in the present embodiment that, when the file server 100 is supposedly utilized in the specific company, the GIPs that are registered in the address permission table 22 are, for example, the GIPs of the NAT routers of a branch office, the GIPs of the NAT routers of a sales offices, and the like.

Moreover, the permission PID information 402 that is sent from the file server 100 along with the permission GIP information 400 includes the printer IDs (PID) for identifying the plurality of printers including the printers 70, 80, 82, 90 and 92, and the print permission levels of the files corresponding to the printers. When the controller 16 of the intermediation server 10 receives the permission PID information 402 from the file server 100, the controller 16 registers each information included in the permission PID information 402 into the printer permission table 24 of the memory 14 (see FIGS. 1 and 7) (S2).

As shown in FIG. 7, the printer permission table 24 includes a plurality of combination information 154 to 162. Each of the combination information 154 to 162 is information which a printer ID (PID) 150 and print permission level 152 are related. Note that the print permission level 152 for a printer indicates the maximum value of the secret level of a file that is permitted to be printed. For example, the permission level 152 for a printer having a PID "756868" included in the combination information 158 is "3." In this example, the printer having a PID "756868" is permitted to print an image expressed by a file having a secret level of "3" or lower, but is prohibited from printing an image expressed by a file having a secret level of "4" or higher.

As shown in FIG. 7, combination information 164 is registered in the printer permission table 24. The combination information 164 indicates that the print permission level for a printer having a PID that is not registered in the print permission table 24 is "1." Specifically, the printer having the PID that is not registered in the printer permission table 24 is permitted to print out only a file having the secret level of "1." In the present embodiment, the administrator of the file server 100 registers the permission GIP information 400 and the permission PID information 402 into the memory 104 in advance. Instead, the administrator of the intermediation server 10 may register the permission GIP information 400 and the permission PID information 402 into the memory 14 of the intermediation server 10 in advance. In this case, when the administrator registers the permission GIP information 400 and the permission PID information 402 into the memory 14 of the intermediation server 10, the address permission table 22 and the printer permission table 24 are created.

Figure 2:
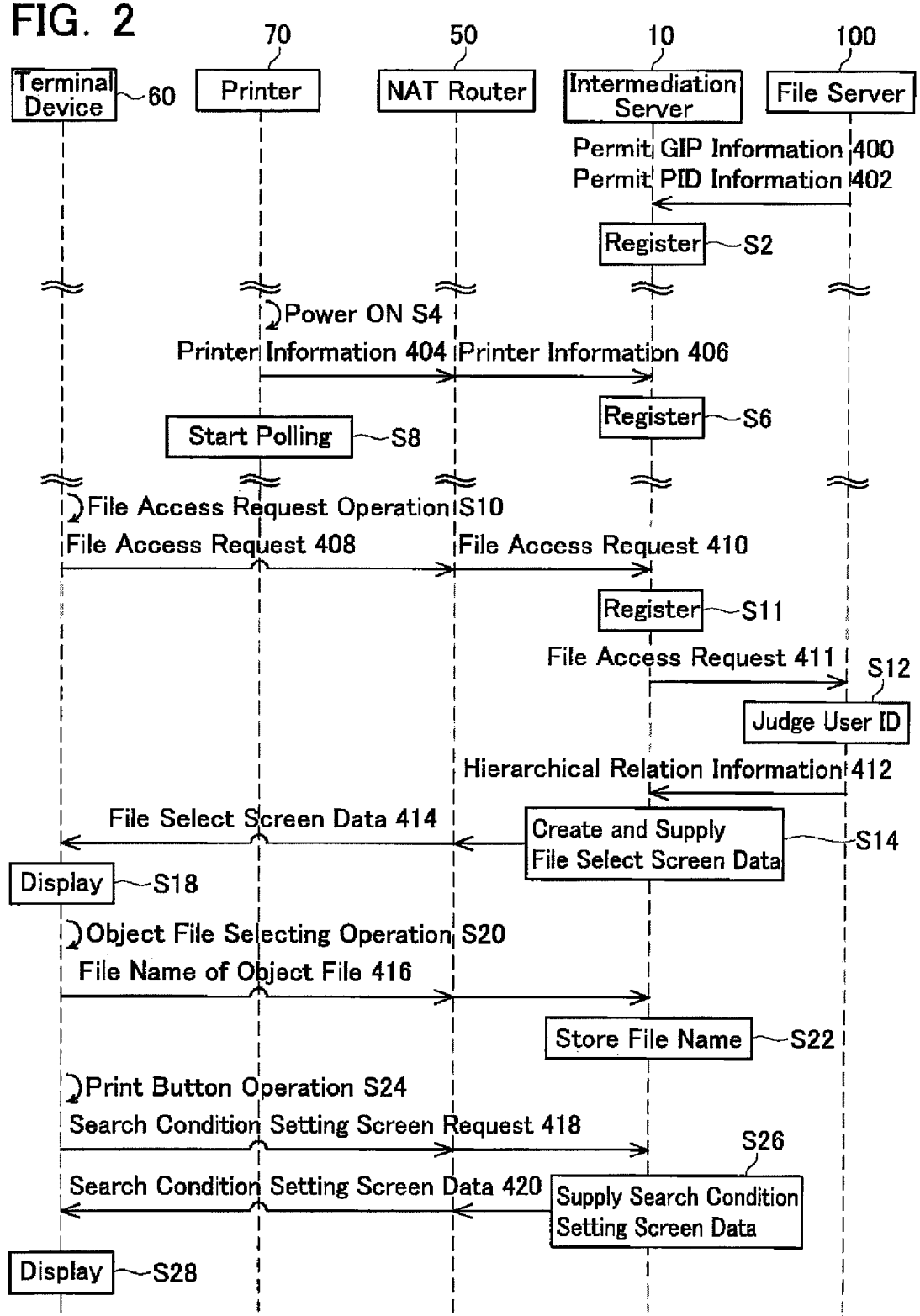
FIG. 2 shows a sequence diagram of processes performed by each device.

In addition, as shown in FIG. 2, when the power of the printer 70 is turned ON in S4, the printer 70 sends printer information 404 to the NAT router 50 serving as a gateway of the printer 70. As shown in FIG. 8, the printer information 404 includes a header 404a and body 404b. The GIP of the intermediation server 10 is set as a destination IP address in the header 404a (more specifically, an IP header). Also, the PIP of the printer 70 is set as a sender IP address in the header 404a. The body 404b includes a URL (Uniform Resource Locator) 304 of the intermediation server 10, a printer name 306, model name 308, PID, and PIP of the printer 70, as well as a subnet mask 314 and location information 316.

When the NAT router 50 receives the printer information 404, the NAT router 50 changes the sender IP address included in the header 404a of the printer information 404 from the PIP of the printer 70 to the GIP of the NAT router 50 (i.e., "133.152.0.1" (see FIG. 1)). As a result, printer information 406 is created. Note that each information within a body 406b of the printer information 406 is the same as each information within the body 404b of the printer information 404. The NAT router 50 sends the printer information 406 to the intermediation server 10 via the Internet 4.

The printer 70 can execute communication via the Internet 4 as the PIP of the printer 70 is changed to the GIP of the NAT router 50 serving as the gateway of the printer 70, as described above. Therefore, when the NAT router 50 changes the PIP of the printer 70 to the GIP of the NAT router 50, the GIP (i.e., "133.152.0.1") is allotted to the printer 70. Note that the GIP of the NAT router 50 serving as the gateway of the printer 70 is sometimes called "the GIP of the printer 70" hereinafter.

In S6 shown in FIG. 2, a registration unit 30 of the intermediation server 10 (see FIG. 1) acquires the printer information 406 and registers each information included in the printer information 406 into the printer information table 26 within the memory 14 (see FIGS. 1 and 9). As shown in FIG. 9, the printer information table 26 includes a plurality of combination information 390 to 398. Each of the plurality of combination information 390 to 398 is information with which a printer ID 370, printer name 372, model name 374, global IP address 376, private IP address 378, subnet mask 38Q, and location information 382 are related. In the present embodiment, the combination information 390 represents information on the printer 70 shown in FIG. 1. As described above, because the GIP of the printer 70 is identical to the GIP of the NAT router 50, the global IP address included in the combination information 390 related to the printer 70 is "133.152.0.1" (see the NAT router 50 shown in FIG. 1).

Although FIG. 2 shows the printer 70 only, the other printers 80, 82, 90 and 92 also send the printer information to the intermediation server 10, similar to the printer 70. Accordingly, the registration unit 30 of the intermediation server 10 acquires the printer information of the respective printers 80, 82 and the like and registers information included in each of the printer information into the printer information table 26. The combination information 392, 394, 396 and 398 shown in the printer information table 26 of FIG. 9 represent the printer information on the printers 80, 82, 90 and 92, respectively. For example, the printer 80 and the printer 82 send the printer information thereof to the intermediation server 10 via the same NAT router 52. Therefore, the global IP address included in the combination information 392 on the printer 80 and the global IP address included in the combination information 394 on the printer 82 are the GIP of the NAT router 52, which is "133.152.0.2" (see FIG. 1).

In S8 shown in FIG. 2, the printer 70 starts polling a job request after sending the printer information 404. The printer 70 consequently sends a job request (see reference numeral 454 in FIG. 3) to the intermediation server 10 on a regular basis. The other printers 80, 82 and the like also execute polling, similar to the printer 70.

When the user of the terminal device 60 wishes to access the folder group and file group 110 stored in the file server 100 after connecting the terminal device 60 to the LAN 9a (see FIG. 1), the user executes a file access request operation using an operation unit (not shown) of the terminal device 60 (S10). When the file access request operation is executed, the terminal device 60 activates a predetermined application that is installed in the terminal device 60 in advance. This predetermined application creates a file access request 408 by using a domain, user ID, password and the like that are input by the user, and sends the created file access request 408 to the NAT router 50 serving as the gateway of the terminal device 60.

Figure 10:
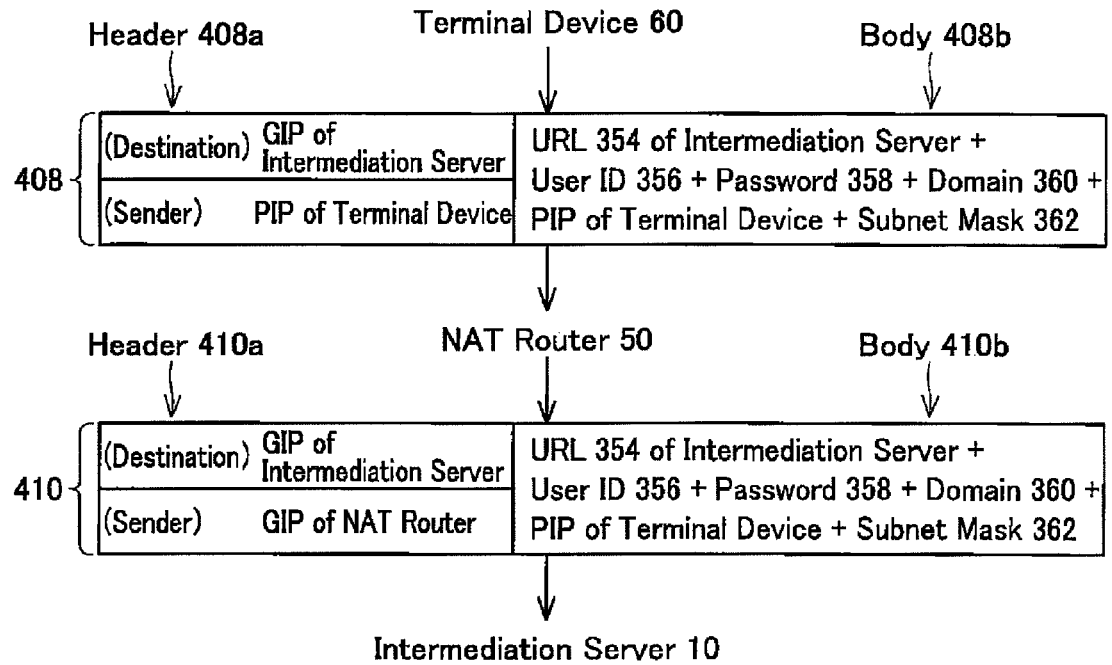
FIG. 10 shows an example of a file access request sent by a terminal device.

As shown in FIG. 10, the file access request 408 that is sent from the terminal device 60 to the NAT router 50 includes a header 408a and a body 408b. The GIP of the intermediation server 10 is set as the destination IP address in the header 408a. The PIP of the terminal device 60 is also set as the sender IP address in the header 408a. The body 408b includes a URL 354 of the intermediation server 10, a user ID 356 for identifying a user of the terminal device 60, a password 358 and domain 360 for the user, the PIP of the terminal device 60, and a subnet mask 362 of the terminal device 60.

When the NAT router 50 receives the file access request 408, the NAT router 50 changes the sender IP address included in the header 408a of the file access request 408, from the PIP of the terminal device 60 to the GIP of the NAT router 50. As a result, a file access request 410 is created. Note that each information within a body 410b of the file access request 410 is the same as each of information within the body 408b of the file access request 408. The NAT router 50 then sends the file access request 410 to the intermediation server 10 via the Internet 4.

The terminal device 60 can execute communication via the Internet 4 as the PIP of the terminal device 60 is changed to the GIP of the NAT router 50 serving as the gateway of the terminal device 60, as described above. Therefore, when the NAT router 50 changes the PIP of the terminal device 60 to the GIP of the NAT router 50, the GIP (i.e., "133.152.0.1") is allotted to the terminal device 60. The GIP of the NAT router 50 serving as the gateway of the terminal device 60 is sometimes called the "GIP of the terminal device 60" hereinafter. As described above, the GIP of the printer 70 is also the GIP of the NAT router 50. In other words, since the printer 70 and the terminal device 60 uses the same gateway (the NAT router 50), the GIP of the terminal device 60 is the same as the GIP of the printer 70.

As already known, when changing the sender IP address in FIG. 10, the NAT router 50 actually changes the PIP and a first port number of the terminal device 60 to the GIP and a second port number of the NAT router 50. The NAT router 50 can transfer a packet returned from the intermediation server 10, correctly to the terminal device 60 within the LAN 9a by storing this correspondence relation. More specifically, the NAT router 50 changes the destination IP address of the packet returned from the intermediation server 10, from the GIP and second port number of the NAT router 50 to the PIP and first port number of the terminal device 60, by reference to the abovementioned correspondence relation. The same applies to the printer 70 illustrated in FIG. 8.

In S11 shown in FIG. 2, an address acquiring unit 32 (see FIG. 1) of the intermediation server 10 acquires the file access request 410 and temporarily registers each information included in the file access request 410 into the memory 14. When the registration process of S11 is finished, hierarchical relation information acquiring unit 44 (see FIG. 1) of the intermediation server 10 transfers a file access request 411 having the same contents as the file access request 410, to the file server 100 specified by the domain 360 (see FIG. 10) included in the file access request 410.

When the file server 100 receives the file access request 411, the file server 100 executes determination on the user ID (S12). More specifically, the file server 100 determines whether or not a combination of the user ID 356 and password 358 included in the file access request 411 is registered as the user information 112 within the memory 104. When the result of the determination made in S12 is positive, the file server 100 sends hierarchical relation information 412 that shows the folder name group and file name group 122 (see FIG. 1) related to the user ID 356, to the intermediation server 10. The hierarchical relation information 412 includes only the folder name group and file name group but does not include files themselves. When the result of the determination made in S12 is negative, the file server 100 does not permit accessing of any of the folders or files stored therein. Specifically, the file server 100 does not send the hierarchical relation information 412 to the intermediation server 10.

The hierarchical relation information acquiring unit 44 of the intermediation server 10 acquires the hierarchical relation information 412. Next, a screen data supplying unit 46 (see FIG. 1) of the intermediation server 10 creates file select screen data 414 based on hierarchical relation information accessible by the user of the terminal device 60 out of the hierarchical relation information 412, and supplies the file select screen data 414 to the terminal device 60 (S14). The screen data supplying unit 46 creates the file select screen data 414 described in a data format that can be interpreted by a web browser of the terminal device 60 (for example, in HTML (Hyper Text Markup Language), XML (Extensible Markup Language), and the like). The web browser of the terminal device 60 thereby causes a display unit (not shown) of the terminal device 60 to display a file select screen 250 (see FIGS. 12 to 14), which is a web page expressed by the file select screen data 414 (S18).

The processes of S12 to S18 described above are described hereinafter in detail. When the result of the determination made in S12 it positive, the file server 100 sends only a folder name group corresponding to the highest folder to the intermediation server 10, the folder name group being a part of the folder name group and file name group 122 ("specific colder name group and file name group" hereinafter) related to the user ID 356 included in the file access request 411, in the folder group and file group 110 shown in FIG. 5. The description continues hereinafter with an example in which a folder name group and file name group corresponding to the entire folder name group and file name group shown in FIG. 5 are the specific folder name group and file name group mentioned above. In the case of this example, the file server 100 first sends only a folder name group (a group of folders "Report," "Budget," "XXX," "YYY" and "ZZZ") corresponding to the highest group of folders 202 to 210, to the intermediation server 10. In response to this, the hierarchical relation information acquiring unit 44 of the intermediation server 10 acquires a folder name group corresponding to the highest group of folders 202 to 210. The secret level of a relevant folder is related to each folder name sent from the file server 100 (see the levels shown in FIG. 5).

In S14, the screen data supplying unit 46 of the intermediation server 10 refers to the address permission table 22 shown in FIG. 6, to specify the permission level "3" related to the GIP of the terminal device 60 registered in S11 (i.e., "133.152.0.1"). Then, the screen data supplying unit 46 specifies the folder name group corresponding to the highest group of folders 202, 204 and 206 (the group of folders "Report," "Budget" and "XXX") having a permission level equal to or lower than the specified permission level "3," from among the folder name group corresponding to the highest group of folders 202 to 210 (the group of folders "Report," "Budget," "XXX," "YYY" and "ZZZ") that are acquired from the file server 100. Hereinafter, the folder name group specified here is referred to as "accessible highest folder name group." Subsequently, the screen data supplying unit 46 creates first file select screen data including a file select field indicating the accessible highest folder name group and a print button, and sends the first file select screen data to the terminal device 60.

Figure 12:
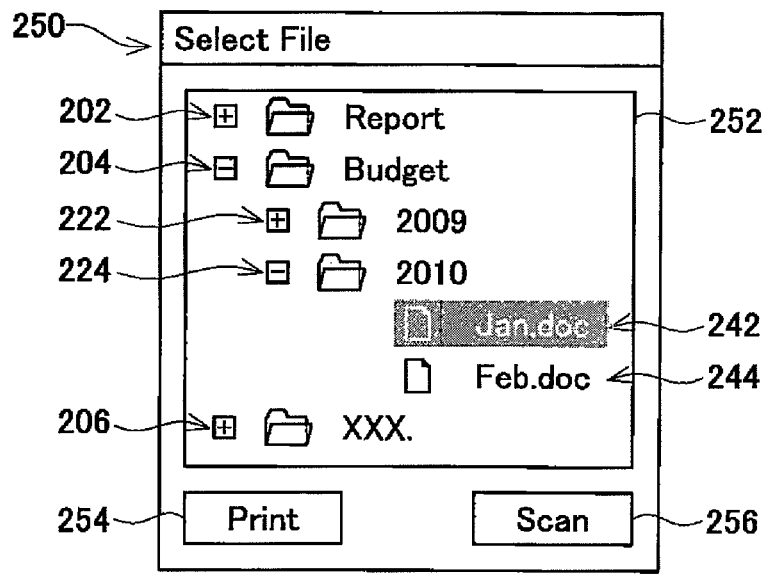
FIG. 12 shows an example of a file select screen.

In S18, the web browser of the terminal device 60 displays a first file select screen based on the abovementioned first file select screen data received from the intermediation server 10. With reference to FIG. 12, the configuration of the first file select screen is described. The file select screen 250 shown in FIG. 12 comprises a file select field 252, print button 254, and scan button 256. At the point of time when the first file select screen is displayed, only the accessible highest folder name group (the group of folders "Report," "Budget" and "XXX") is displayed within the file select field 252, but the folder name group (the group of folders "2009" and "2010") and file name group (the group of files "Jan.doc" and "Feb.doc") corresponding to the lower folders 222 and 224 are not displayed. The user of the terminal device 60 can select one folder name from the highest folder name group displayed within the file select field 252. An example in which the user selects the folder name "Budget" corresponding to the folder 204 is described hereinafter. The terminal device 60 sends the selected highest folder name "Budget" to the intermediation server 10. When the hierarchical relation information acquiring unit 44 of the intermediation server 10 receives the highest folder name "Budget," the hierarchical relation information acquiring unit 44 transfers the highest folder name "Budget" to the file server 100.

When the file server 100 receives the highest folder name "Budget," the file server 100 sends the folder name group (the group of folders "2009," "2010," and "2011") corresponding to the group of lower folders 222 to 226 (see FIG. 5) under the highest folder 204 to the intermediation server 10. Consequently, the hierarchical relation information acquiring unit 44 of the intermediation server 10 acquires the folder name group corresponding to the group of lower folders 222 to 226. The secret level of a relevant folder is also related with each of the folder names acquired here (see the levels shown in FIG. 5).

In S14, the screen data supplying unit 46 of the intermediation server 10 specifies the folder name group (the group of folders "2009" and "2010") corresponding to the group of lower folders 222 and 224 having a permission level equal to or lower than the specified permission level "3," from the folder name group corresponding to the lower folders 222 to 226 received from the file server 100. Hereinafter, the folder name group specified here is referred to as "accessible lower folder name group." Subsequently, the screen data supplying unit 46 creates second select screen data indicating the accessible lower folder name group, as the group of lower folders under the highest folder name "Budget" selected by the user of the terminal device 60, and sends the second select screen data to the terminal device 60.

In S18, the web browser of the terminal device 60 displays a second file select screen based on the abovementioned second file select screen data received from the intermediation server 10. The accessible highest folder name group (the group of folders "Report," "Budget" and "XXX") and the accessible lower folder name group (the group of folders "2009" and "2010") are displayed within the file select field 252 (see FIG. 12) on the abovementioned second file select screen, but the file name group (the group of files "Jan.doc"

and "Feb.doc") is not displayed. The user of the terminal device 60 can select one folder name from the lower folder name group displayed within the file select field 252. An example in which the user selects the folder name "2010" corresponding to the folder 224 is described hereinafter. The terminal device 60 sends the selected lower folder name "2010" to the intermediation server 10. When the hierarchical relation information acquiring unit 44 of the intermediation server 10 receives the lower folder name "2010," the hierarchical relation information acquiring unit 44 transfers the lower folder name "2010" to the file server 100.

When the file server 100 receives the lower folder name "2010," the file server 100 sends the file name group (the group of files "Jan.doc," "Feb.doc" and "Mar.doc") corresponding to the group of lower files 242 to 246 (see FIG. 5) under the lower folder name "2010," to the intermediation server 10. Consequently, the hierarchical relation information acquiring unit 44 of the intermediation server 10 acquires the file name group corresponding to the group of files 242 to 246. The secret level of a relevant folder is also related to each of the file names acquired here (see the levels shown in FIG. 5).

In S14, the screen data supplying unit 46 of the intermediation server 10 specifies the file name group (the group of files "Jan.doc" and "Feb.doc") corresponding to the files 242 and 244 having a permission level equal to or lower than the specified permission level "3," from the file name group corresponding to the files 242 to 246 received from the file server 100. The file name group specified here is referred to as "accessible file name group" hereinafter. Subsequently, the screen data supplying unit 46 creates third select screen data indicating the accessible file name group, as the lower files under the lower folder name "2010" selected by the user of the terminal device 60, and sends the third select screen data to the terminal device 60.

Figure 11:
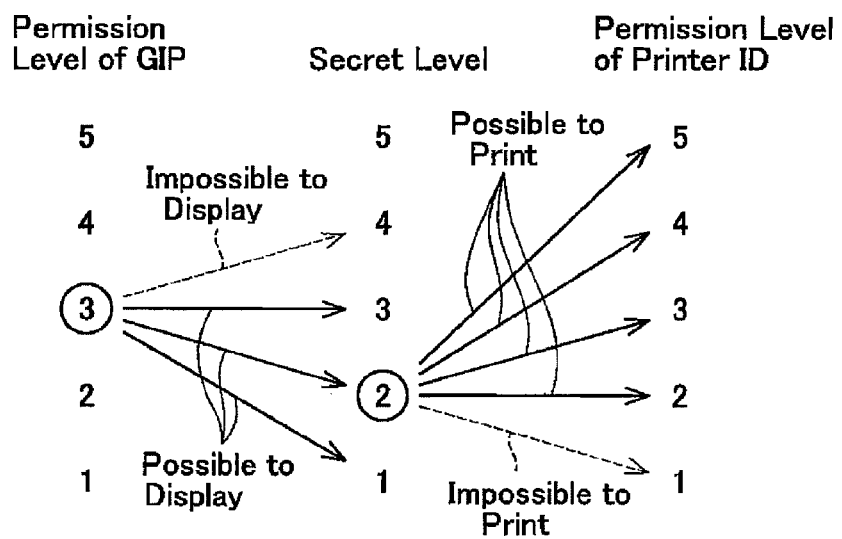
FIG. 11 schematically shows a relationship among a permission level of a GIP, a secret level of a file, and a permission level of the printer.

In S18, the web browser of the terminal device 60 displays a third file select screen 250 shown in FIG. 12, based on the abovementioned third file select screen data received from the intermediation server 10. The accessible highest folder name group (the group of folders "Report," "Budget" and "XXX"), the accessible lower folder name group (the group of folders "2009" and "2010"), and the accessible file name group (the group of files "Jan.doc" and "Feb.doc") are displayed within the file select field 252 (see FIG. 12) on the third file select screen 250. Specifically, when the permission level of the GIP of the terminal device 60 is "3" as shown in FIG. 11, the user of the terminal device 60 can access only the folders and files having a secret level of "3" or lower.

In S20 shown in FIG. 2, the user of the terminal device 60 can select one file name corresponding to a target file to be printed, from the file name group displayed within the file select field 252. In the example shown in FIG. 12, the user selects the file name "Jan.doc" corresponding to the file 242. As shown in FIG. 2, the terminal device 60 sends the selected file name 416 ("Jan.doc") to the intermediation server 10.

When the controller 16 of the intermediation server 10 receives the file name 416 ("Jan.doc") corresponding to the target file 242, the controller 16 temporarily registers the file name 416 ("Jan.doc") into the memory 14 (S22).

In the example shown in FIG. 12 described above, the terminal device 60 is connected to the LAN 9a (the gateway of the terminal device 60 is the NAT router 50), and the permission level with respect to the GIP of the terminal device 60 (i.e., the GIP of the NAT router 50) is "3. When the terminal device 60 is supposedly connected to the LAN 9c (when the gateway of the terminal device 60 is the NAT router 54 (see FIG. 1)), the GIP of the terminal device 60 is the GIP of the NAT router 54. As shown by the combination information 144 of FIG. 6, the permission level with respect to the GIP of the NAT router 54 is "2." In this case, in S18 shown in FIG. 2, the file select screen 250 that is displayed eventually by the terminal device 60 (the screen that is selected when the user of the terminal device 60 selects the highest folders and lower folders) becomes a screen shown in FIG. 13. The file select field 252 on the file select screen 250 shown in FIG. 13 displays the folder names corresponding to the folders 202, 204, 222 and 224 ("Report," "Budget," "2009" and "2010") having a secret level of "2" or lower, and the file name corresponding to the file 242 ("Jan.doc") having a secret level of "2" or lower.

In addition, when the GIP of the terminal device 60 is supposedly not registered in the address permission table shown in FIG. 6, the permission level with respect to this GIP is "1," as shown by the combination information 148 in FIG. 6. In this case, in S18 shown in FIG. 2, the file select screen 250 displayed by the terminal device 60 becomes a screen shown in FIG. 14. The file select field 252 on the file select screen 250 shown in FIG. 14 displays only the folder name "Budget" corresponding to the folder 202 having a secret level of "1." Even if the folder name "Budget" is selected by the user of the terminal device 60, the folder names corresponding to the lower folders 222, 224 and 226 are not displayed because all of the lower folders 222, 224 and 226 under the folder name "Budget" have a secret level of "2" or higher.

As shown in FIG. 2, the user of the terminal device 60, after executing the operation for selecting the file name "Jan.doc" corresponding to the target file included in the file select screen 250 (see FIG. 12) can operate the print button 254 included in the third file select screen 250 (S24). At this moment, the terminal device 60 sends a search condition setting screen request 418 to the intermediation server 10 via the NAT router 50.

When the screen data supplying unit 46 of the intermediation server 10 receives the search condition setting screen request 418, the screen data supplying unit 46 supplies search condition setting screen data 420 that is stored in the memory 14 in advance, to the terminal device 60 (S26). The search condition setting screen 420 is also described in the data format that can be interpreted by the web browser of the terminal device 60.

The web browser of the terminal device 60 displays a search condition setting screen 260 based on the search condition setting screen data 420 (S28). With reference to FIG. 15, the configuration of the search condition setting screen 260 is described. The search condition setting screen 260 is a screen used for setting a condition for searching a printer that should execute printing of an image expressed by the selected target file ("specific printer" hereinafter). The search condition setting screen 260 has a first radio button 262 for selecting a first mode for searching the printer using the global IP address, and a second radio button 264 for selecting a second mode for searching the printer using the global IP address and the private IP address. In S40 shown in FIG. 3, the user of the terminal device 60 selects either one of the first and second buttons 262 and 264. When an OK button on the search condition setting screen 260 is operated, the terminal device 60 sends a search request 440 that includes information indicating the mode selected by the user (information indicating the first mode or the second mode), to the intermediation server 10 via the NAT router 50.

Figure 3:
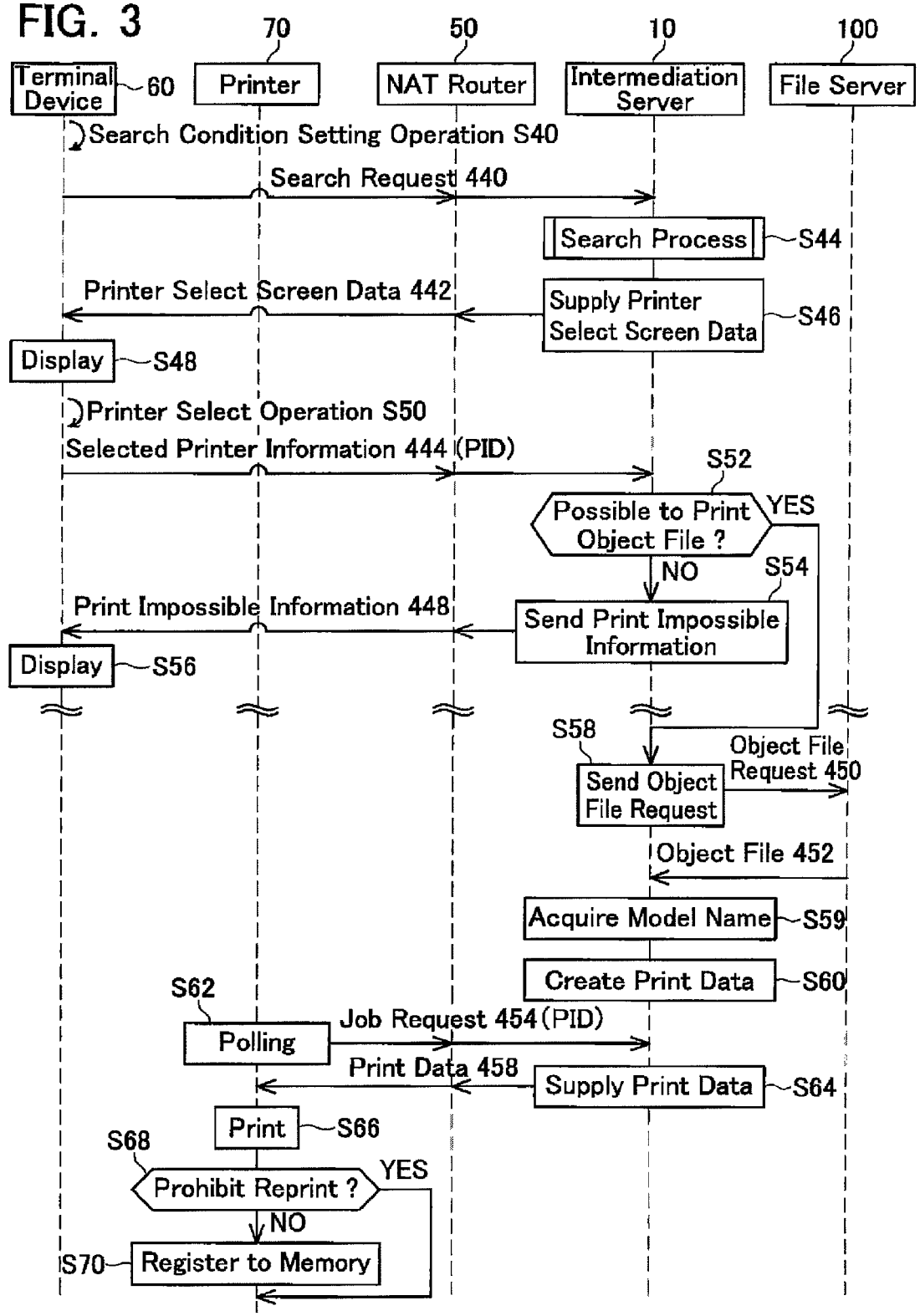
FIG. 3 shows a sequence diagram following the one shown in FIG. 2.
Figure 4:
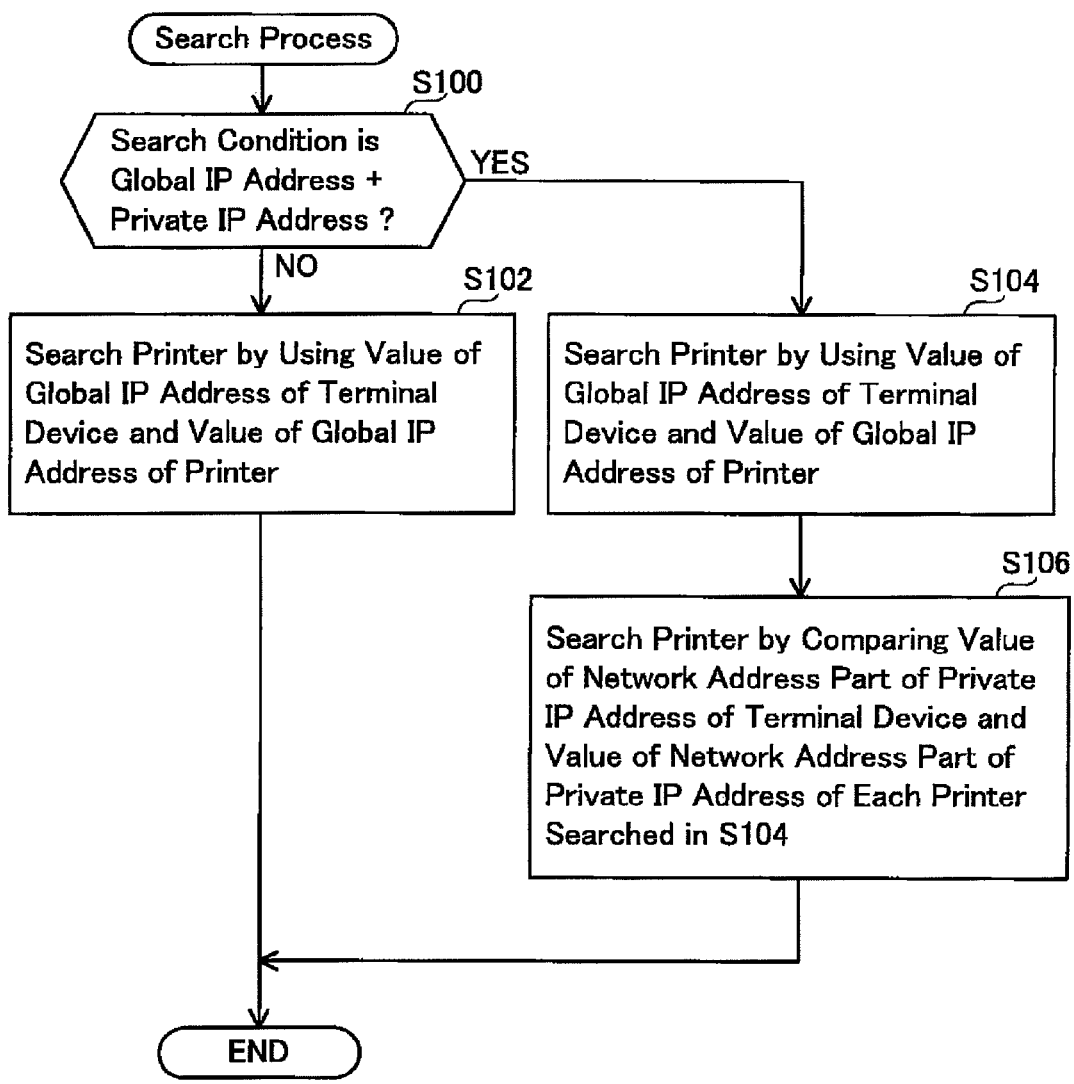
FIG. 4 shows a flowchart of a searching process.

In S44 shown in FIG. 3, a search unit 34 of the intermediation server 10 (see FIG. 1) executes a searching process after receiving the search request 440. With reference to FIG. 4, the searching process is described. The search unit 34 determines whether the information indicating the mode included in the search request 440 is the second mode for searching the printer using the global IP address and private IP address (S100). When the result here is NO, which means when the first mode for searching the printer using the global IP address is selected, the search unit 34 executes a process of S102.

In S102, the search unit 34 searches the printer by using the GIP of the terminal device 60, which is temporarily registered in S11 shown in FIG. 2, and the GIPs of the plurality of printers, which are registered in the printer information table 26 shown in FIG. 9 (S102). In particular, the search unit 34 first specifies the class of the GIP "133.152.0.1" of the terminal device 60 (i.e., the class B) that is registered temporarily in S11 shown in FIG. 2. The first 16 bits of the GIP of the class B configures the network address part. Therefore, the search unit 34 specifies the value of the network address part of the GIP of the terminal device 60, by specifying the first 16-bit value "133.152" of the GIP "133.152.0.1" of the terminal device 60. The search unit 34 then specifies, from among the GIPs of the plurality of printers in the printer information table 26 shown in FIG. 9, a GIP in which the same value as the value "133.152" of the network address part of the GIP of the terminal device 60 is set as the value of the network address part. In the present embodiment, the search unit 34 specifies three GIPs of the three printers 70, 80 and 82 (see the combination information 390, 392 and 394) in which the value "133.152" is set as the values of the network address parts of these printers. As a result, the three printers 70, 80 and 82 are searched in S102. The search unit 34 further reads the three combination information 390, 392 and 394 corresponding to the searched three printers 70, 80 and 82, and finishes the process of S102.

On the other hand, when the result of S100 is YES, which means the second mode for searching the printer using the global IP addresses and the private IP addresses is selected, the search unit 34 proceeds to S104. In S104, the search unit 34 executes the same process as the process of S102 described above, to specify three GIPs of the three printers 70, 80 and 82 (see the combination information 390, 392 and 394). Subsequently, the search unit 34 searches the printer by using the PIP of the terminal device 60 that is registered temporarily in S11 shown in FIG. 2, and the PIPs of the three printers 70, 80 and 82 searched in S104 (S106). In particular, the search unit 34 calculates the value of the network address part of the PIP of the terminal device 60 (e.g., "192.168.0") by using the PIP and subnet mask of the terminal device 60 that are registered temporarily in S11 shown in FIG. 2. The search unit 34 then calculates the value "192.168.0" of the network address part of the PIP of the printer 70, by using the PIP and subnet mask of the printer 70 that are included in the combination information 390 (see FIG. 9) corresponding to the printer 70 searched in S104. In the similar manner, the search unit 34 calculates the value "192.168.1" of the network address part of the PIP of the printer 80 searched in S104 (see FIG. 9), and the value "192.168.1" of the network address part of the PIP of the printer 82 searched in S104 (see FIG. 9). Next, the search unit 34 specifies, from among the three printers 70, 80 and 82 searched in S104, a printer in which the value of the network address part of the PIP of the terminal device 60 is set as the value of the network address part. In the present embodiment, only the printer 70 is specified. Therefore, the printer 70 is searched in S106. The search unit 34 reads the combination information 390 corresponding to the searched printer 70, and finishes the process of S106.

As shown in FIG. 3, when the searching process (S44 in FIG. 3) ends, a providing unit 36 of the intermediation server 10 (see FIG. 1) creates printer select screen data 442 in accordance with the result of the searching process, and supplies the printer select screen data 442 to the terminal device 60 (S46). The printer select screen data 442 includes the printer name 372, model name 374 and location information 382 that are included in the combination information 390 read in S102 or S106 shown in FIG. 4. Note that the printer select screen data 442 is also described in the data format that can be interpreted by the web browser of the terminal device 60. In addition, the printer select screen data 442 includes the printer ID included in each combination information 390 read in S102 or S106 shown in FIG. 4, the printer ID is not displayed.

The web browser of the terminal device 60 displays a printer select screen 280 based on the printer select screen data 442 (S48). The configuration of the printer select screen 280 is described with reference to FIG. 16. The printer select screen 280 has a printer select field 282. Combination information 290 to 294 are displayed within the printer select field 282. The combination information 290 to 294 are information related to a model name 284, printer name 286 and location information 288. Each combination information displayed within the printer select field 282 corresponds to the single printer searched in S102 or S106 shown in FIG. 4. For example, the combination information 290 relates to the printer 70 (see the combination information 390 shown in FIG. 9).

In S50 shown in FIG. 3, the user of the terminal device 60 selects, from among the combination information 290 to 294 displayed within the printer select field 282, the combination information corresponding to the specific printer that should execute printing of the image expressed by the target file selected in S20 shown in FIG. 2 (S50). By the specific printer being selected by the user, the terminal device 60 selects the combination information corresponding to the specific printer. In the example shown in FIG. 16, the combination information 290 (i.e., the printer 70) is selected. When an OK button within the printer select field 282 is operated, the terminal device 60 sends selected printer information 444 to the intermediation server 10 via the NAT router 50. The selected printer information 444 includes the printer ID of the specific printer 70 (this is included in the printer select screen data 442) corresponding to the combination information 290 selected in S50.

When a print data creating unit 40 of the intermediation server 10 (see FIG. 1) receives the selected printer information 444, the print data creating unit 40 determines whether the specific printer 70 corresponding to the printer ID included in the selected printer information 444 can print the target file or not (S52). More specifically, in S52, the print data creating unit 40 refers to the printer permission table 24 shown in FIG. 7, to specify the permission level related to the printer ID included in the selected printer information 444. Subsequently, the print data creating unit 40 compares the specified permission level with the secret level ("2" of the file 242 shown in FIG. 5 in the present embodiment) of the target file (the file 242 "Jan.doc" shown in FIG. 12 in the present embodiment) that is registered in S22 shown in FIG. 2. When the permission level is equal to or higher than the secret level, the print data creating unit 40 determines that the result of S52 is YES. On the other hand, when the permission level is lower than the secret level, the print data creating unit 40 determines that the result of S52 is NO. For example, when the secret level of the target file is "2" as shown in FIG. 11, the specific printer 70 is permitted to print out the target file, as long as the permission level of the specific printer 70 is "2" or higher. On the other hand, when the permission level of the specific printer 70 is "1," the specific printer 70 is not permitted to print out the target file.

As shown in FIG. 3, when the result of S52 is NO, the print data creating unit 40 sends print impossible information 448 to the terminal device 60 (S54). The terminal device 60 displays a screen showing the impossibility of printing, based on the print impossible information 448 (S56). As a result, the user can find out that the specific printer 70 selected in S50 of FIG. 3 is not permitted to print out the image expressed by the target file 242 "Jan.doc" selected in S20 of FIG. 2.

On the other hand, when the result of S52 is YES, the print data creating unit 40 sends a target file request 450 to the file server 100. The target file request 450 includes the file name "Jan.doc" of the target file 242. When the file server 100 receives the target file request 450, the file server 100 reads the target file 242 corresponding to the file name "Jan.doc" from the memory 104, and sends the target file 242 to the intermediation server 10. Consequently, the print data creating unit 40 of the intermediation server 10 acquires the target file 242.

In S59, a model information acquiring unit 38 of the intermediation server 10 (see FIG. 1) refers to the printer information table 26 shown in FIG. 9, to acquire a model name "M1" related to the PID of the specific printer 70. The memory 104 of the intermediation server 10 has previously stored therein a driver program for creating print data described in a format that can be interpreted by the printer with the model name. The print data creating unit 40 of the intermediation server 10 uses the driver program corresponding to the model name "M1," to convert the data within the target file 242 "Jan.doc" into the printer data of the format that can be interpreted by the specific printer 70 (S60). Subsequently, The print data creating unit 40 relates the PID of the specific printer 70 to the print data created in S60, and stores the print data and the PM in the memory 14 temporarily.

As described above, the printer 70 starts polling in S8 shown in FIG. 2. Specifically, the printer 70 sends the job request 454 to the intermediation server 10 via the NAT router 50, as described in S62 shown in FIG. 3. The job request 454 includes the PID of the printer 70.

When a print data supplying unit 42 of the intermediation server 10 (see FIG. 1) receives the job request 454, the print data supplying unit 42 determines whether the print data that is related to the PID included in the job request 454 exists in the memory 14 or not. Since the PID of the printer 70 and the print data are stored in memory 14 in S60 as described above, the determination process described above is determined positively. In this case, the print data supplying unit 42 (see FIG. 1) supplies print data 458 related to the PID of the printer 70, to the printer 70 via the NAT router 50 (S64). In so doing, the print data supplying unit 42 determines whether the secret level "2" of the target file 242 "Jan.doc" to be printed out is equal to or higher than a predetermined secret level ("3" in the present embodiment). Because the secret level "2" of the target file 242 "Jan.doc" is lower than the predetermined secret level "3," the print data supplying unit 42 sends neither the print data nor an instruction to prohibit re-printing. Note that, when the secret level of the target file is supposedly equal to or higher than the predetermined secret level, the print data supplying unit 42 sends the instruction to prohibit the re-printing.

The printer 70 executes printing in accordance with the print data received from the intermediation server 10 (S66). The printer 70 then determines whether the print data is sent along with the instruction to prohibit re-printing (S68). When the result here is YES, the printer 70 deletes the print data without registering it in a memory (not shown) of the printer 70. This prohibits re-printing that uses the sent data. On the other hand, when the result of S66 is NO, the printer 70 registers the print data into the memory of the printer 70. Therefore, the user of the printer 70 (the user of the terminal device 60) can cause the printer 70 to execute re-printing using the print data.

The communication system 2 according to the present embodiment has been described in detail. As described in S102 shown in FIG. 4, the intermediation server 10 of the present embodiment searches the printers that are allotted the same values as the value of the network address part of the GIP of the terminal device 60, as the values of the network address parts of the GIP addresses of the printers (the printers 70, 80 and 82 in the present embodiment). When the value of the network address part of the GIP is identical between the terminal device 60 and the printers 70 and the like, the printers are likely to exist in the vicinity of the terminal device. Thus, according to the present embodiment, the printers 70, 80 and 82 present in the vicinity of the terminal device 60 can be searched using a nonconventional, new method, and the information on the neighbor printers 70, 80 and 82 (the screen shown in FIG. 16) can be provided to the terminal device 60.

As described in S104 and S106 shown in FIG. 4, the intermediation server 10 of the present embodiment searches the printers that are allotted the same value as the value of the network address part of the GIP of the terminal device 60, as the values of the network address parts of the GIPs of the printers (the printers 70, 80 and 82 in the present embodiment) (S104), and searches, from the printers searched in S104, the printer that is allotted the same value as the value of the network address part of the PIP of the terminal device 60, as the value of the network address part of the PIP of the printer (the printer 70 in the present embodiment) (S106). In the present embodiment (FIG. 1), when not only the value of the network address part of the GIP but also the value of the network address part of the PIP are identical between the terminal device 60 and the printer 70, it means that the terminal device 60 and the printer 70 are connected to the same LAN 9*a*. Therefore, according to the present embodiment, the single printer 70 that is connected to the same LAN 9*a* as with the terminal device 60 can be searched.

In the printer information table 26 of the intermediation server 10 (see FIG. 6), the PIP and subnet mask of each of the printers 70 and the like are registered. The intermediation server 10 also temporarily registers the PIP and subnet mask of the terminal device 60 into the memory 14 in S11 shown in FIG. 2. Thus, the intermediation server 10 can create the value of the network address part of the PIP of each of the printers 70 and the like, by using the PIP and subnet mask of each of the printers 70 and the like. The intermediation server 10 can further create the value of the network address part of the PIP of the terminal device 60, by using the PIP and subnet mask of the terminal device 60.

As described in S60 and S64 shown in FIG. 3, the intermediation server 10 creates the print data in response to the model "M1" of the specific printer 70, and supplies the print data to the specific printer 70. The terminal device 60 therefore can cause the specific printer 70 to execute printing. Furthermore, the intermediation server 10 of the present embodiment stores the driver program for creating the print data corresponding to the model of each of the printers 70 and the like. Therefore, the terminal device 60 does not need to store the driver program corresponding to the model name of each of the printers 70 and the like.

As shown in FIG. 8, the intermediation server 10 acquires the GIP of the printer 70 from the printer 70 via the NAT router 50. Specifically, the administrator of the system does not need to register information required for the intermediation server 10 to search the printer 70 (the GIP of the printer 70), into the intermediation server 10. The task load of the administrator can be reduced. Moreover, the intermediation server 10 acquires the GIP of the terminal device 60 from the terminal device 60 via the NAT router 50, as shown in FIG. 10. In so doing, the user of the terminal device 60 does not need to input the GIP of the terminal device 60 into the terminal device 60. The task load of the user of the terminal device 60 can be reduced. When the administrator of the system or the user of the terminal device 60 supposedly adopts a configuration of manually imputing the information required for searching the printer 70 (e.g., the address of the printer 70, etc.), an inputting error might occur, in which case appropriate search results cannot be provided to the terminal device 60. On the contrary, according to the present embodiment, the information required for searching the printer 70 (the GIP of the printer 70 and the GIP of the terminal device 60) does not need to be input manually, thus, the appropriate search results can be provided to the terminal device 60.

As described in S12 and S14 shown in FIG. 2, the intermediation server 10 of the present embodiment acquires the hierarchical relation information from the file server 100 that is normally used by the user (a file server used in a company, for example), and generates the file select screen data that can be interpreted by the browser. The user can check the file select field 252 within the file select screen 250 by using the browser of the terminal device 60 in an environment that is substantially the same as the environment in which the user normally uses the file server (e.g. the environment in the company), even from the outside (e.g. during a business trip). In this manner, the user can easily select a target file within the file server 100 that the user normally uses. Also, since the screen includes the print button 254 for instructing to execute printing, the user can easily instruct the printing of the selected target file. Specifically, the user can easily print out the target file even in the outside environment.

As described in S12 and S14 shown in FIG. 2, the intermediation server 10 of the present embodiment acquires the hierarchical relation information of the folder group and file group from the file server 100, and creates the file select screen data, and supplies the file select screen data to the terminal device 60. The terminal device 60 can display the file select screen 250 (see FIGS. 12 to 14) by using the select screen data supplied by the intermediation server 10. Accordingly, the user of the terminal device 60 can view specific hierarchical relation information accessible by the user, from the hierarchical relation information that the intermediation server 10 acquires from the file server 100. Specifically, the user can select a target file to be printed out, based on the hierarchical relation of the folder group and file group that is shown by the specific hierarchical relation information. Compared to a configuration in which the folder group is not displayed but only the file group is displayed (a configuration in which the target file cannot be selected based on the hierarchical relation), the user can select the target file more efficiently. For this reason, the task of the user selecting the target file can be supported.

Figure 13:
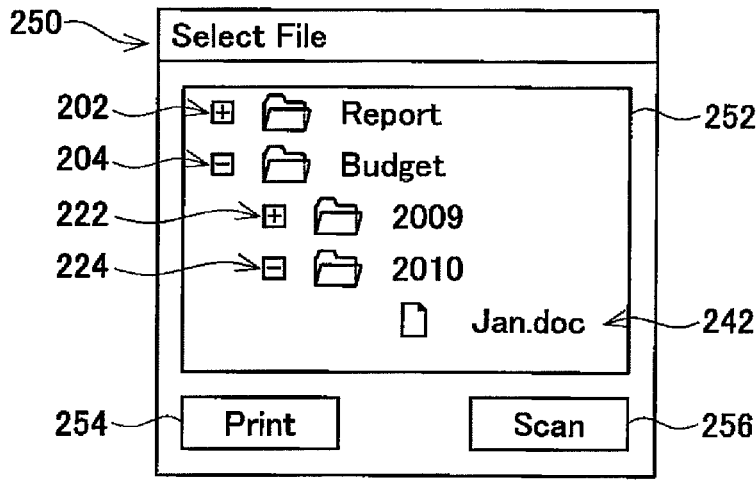
FIG. 13 shows an example of the file select screen.
Figure 14:
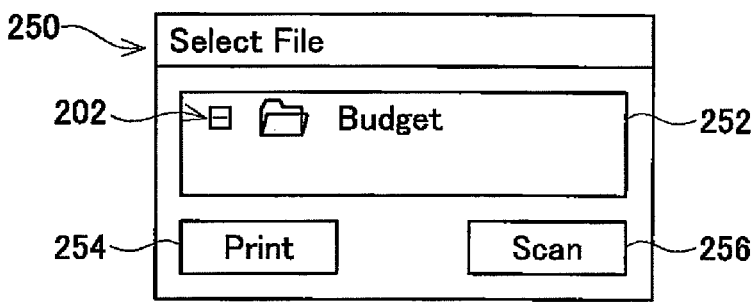
FIG. 14 shows an example of the file select screen.

As shown in FIGS. 12 to 14, the intermediation server 10 can change the hierarchical relation information to be displayed by the terminal device 60, in accordance with the GIP of the terminal device 60. More specifically, when the GIP of the terminal device 60 is "133.152.0.1" (see FIG. 12), the folder names ("Report," "Budget," "XXX," "2009," and "2010") corresponding to the folders 202, 204, 206, 222 and 224 and the file names ("Jan.doc" and "Feb.doc") corresponding to the files 242 and 244 are displayed. However, when the GIP of the terminal device 60 is "201.57.37.1" (see FIG. 13), the folder name ("XXX") corresponding to the folder 206 and the file name ("Feb.doc") corresponding to the file 244 are not displayed in the file select field 252 on the file select screen 250.

As shown in FIGS. 12 to 14, the intermediation server 10 can change the file names displayed on the file select screen 250 (FIGS. 12 and 13) that are obtained when the GIP of the terminal device 60 is registered in the address permission table 22, as well as the file names displayed on the file select screen 250 (FIG. 14) that are obtained when the GIP of the terminal device 60 is not registered in the address permission table 22. In particular, when the GIP of the terminal device 60 is the GIP registered in the address permission table 22 ("133.152.0.1") (see FIG. 12), the file names ("Jan.doc" and "Feb.doc") corresponding to the files 242 and 244 are displayed in the file select field 252 of the file select screen 250. On the other hand, when the GIP of the terminal device 60 is the GIP that is not registered in the address permission table 22 (see FIG. 14), the file names ("Jan.doc" and "Feb.doc") corresponding to the files 242 and 244 are not displayed in the file select field 252 of the file select screen 250.

As shown in FIGS. 12 and 13, the intermediation server 10 can change the file names displayed on the file select screen 250, in accordance with the permission level of the GIP of the terminal device 60. In particular, when the permission level of the GIP of the terminal device 60 is "3" (see FIG. 12), the file names ("Jan.doc" and "Feb.doc") corresponding to the files 242 and 244 are displayed in the file select field 252 of the file select screen 250. On the other hand, when the permission level of the GIP of the terminal device 60 is "2" (see FIG. 13), the file name ("Feb.doc") corresponding to the file 244 is not displayed in the file select field 252 of the file select screen 250.

As described in S52 shown in FIG. 3, the intermediation server 10 compares the permission level "3" of the specific printer 70 with the secret level "2" of the target file 242 "Jan.doc." When the permission level is equal to or higher than the secret level, the intermediation server 10 determines that the result of S52 is YES, and determines to cause the specific printer to print out the image expressed by the target file. On the other hand, when the permission level is lower than the secret level, the intermediation server 10 determines that the result of S52 is NO, and determines to not cause the specific printer to print out the image expressed by the target file. It is possible to construct a system that does not allow a printer to print out the target file whose secret level is higher than the predetermined secret level, the printer having the print permission level equal to or lower than the predetermined secret level.

As described in S58 shown in FIG. 3, after determining to cause the specific printer 70 to print out the image expressed by the target file (YES in S52), the intermediation server 10 acquires the target file 242 from the file server 100. Compared to a configuration in which the target file 242 is acquired from the file server 100 prior to determining that the specific printer 70 is caused to print out the image expressed by the target file, the intermediation server 10 does not need to perform a wasted process in the present configuration, since a situation does not occur that the determination on not causing the specific printer 70 to perform the printing is made after the target file 242 is acquired, so the acquired target file 242 is not wasted.

As described in S68 shown in FIG. 3, the intermediation server 10 determines whether to permit the specific printer to perform re-printing using the print data, in accordance with whether the secret level "3" of the target file 242 is higher than the predetermined secret level or not. It is possible to construct a system in which the specific printer 70 is not permitted to re-print the target file whose secret level is higher than the predetermined secret level.

As described in S46 shown in FIG. 3, when the user of the terminal device 60 uses the file select screen 250 to instruct the execution of printing of the image expressed by the target file 242, the intermediation server 10 supplies the terminal device 60 with the printer select screen data representing the printer select screen 280 to permit the user of the terminal device 60 to select the specific printer 70 from among the one or more printers. When the user of the terminal device 60 selects the specific printer 70 via the printer select screen 280, the intermediation server 10 creates the print data. Therefore, the user of the terminal device 60 can cause the specific printer 70 selected by the user himself/herself, to execute printing.

The correspondence relation between the configuration of the embodiment described above and the configuration of the present invention is now described. The intermediation server 10 is the example of the "printer searching device" and the "print intermediation server." The GIPs of the plurality of printers 70 and the like that are registered in the address permission table 22 shown in FIG. 6 are examples of the "first kind of global IP address" and the GIP of the terminal device 60 is an example of the "second kind of global IP address." The registering unit 30 and the address acquiring unit 32 are examples of the "first acquiring unit" and "second acquiring unit." The PIPs of the plurality of printers 70 and the like that are registered in the printer information table 26 shown in FIG. 9 are an example of the "first kind of private IP addresses." The PIP of the terminal device 60 is an example of the "second kind of private IP address."

The expression such as "acquire a plurality of a first kind of global IP addresses that is allotted to a plurality of printers" may be rephrased to, for instance, "acquire, for a plurality of printers, global IP addresses on the WAN side of LANs to which the printers belong" or "acquire, for a plurality of printers, global IP addresses which are determined by NAT routers of LANs to which the printers belong."

Second Embodiment

The differences between the second embodiment and the first embodiment will be described. In the present embodiment, in place of the process of S102 or S104 shown in FIG. 4 described above, the search Unit 34 of the intermediation server 10 executes, in the searching process, a process of searching the printer 70 that is allotted the same value as the entire value of the GIP of the terminal device 60, as the GIP of the printer. When the entire value of the GIP is identical between the terminal device 60 and the printers 70 and the like, the terminal device 60 and the printer 70 exist within the same LAN 9a. According to the present embodiment, the printer 70 existing within the same LAN 9a as with the terminal device 60 can be searched.

Some Modifications of the embodiments described above are listed hereinbelow.

(1) In the foregoing embodiments, the IP address of IPv4 (Internet Protocol Version 4) is used, but the IP address of IPv6 (Internet Protocol Version 6) or other version may be used. For instance, in the case of the IP address of IPv6, the first 64 bits corresponds to the network address part (prefixed part).

(2) In the foregoing embodiments, when the permission level of the GIP of the terminal device 60 is lower than the secret levels of the folders or the secret levels of the files as shown in FIGS. 12 to 14, the folder names of these folders and the file names of these files are not displayed on the file select screen 250. However, when the permission level of the GIP of the terminal device 60 is lower than the secret levels of the folders or the secret levels of the files, the folder names of these folders and the file names of these files may be displayed so as not to be selected (in so-called a grayout form).

(3) In the foregoing embodiments, when supplying the print data to the printer 70, and when the secret level of the target file is equal to or higher than the predetermined secret level, the print data supplying unit 42 of the intermediation server 10 sends a re-print prohibition instruction, but when the secret level of the target file is lower than the predetermined secret level, the print data supplying unit 42 does not send the re-print prohibition instruction. Alternatively, when the secret level of the target file is equal to or higher than the predetermined secret level, the print data supplying unit 42 may not send a re-print permission instruction, but when the secret level of the target file is lower than the predetermined secret level, the print data supplying unit 42 may send the re-print permission instruction. Generally, it is sufficient that whether to permit the execution of re-printing or not is determined in accordance with the secret level of the target file.

(4) In the foregoing embodiments, the intermediation server 10 registers the PIPs and subnet masks of the printers 70 and the like into the printer information table 26 (see FIG. 6). The intermediation server 10 also temporarily registers the PIP and subnet mask of the terminal device 60 into the memory 14 in S11 shown in FIG. 2. Alternatively, the intermediation server 10 may register the values of the network address parts of the PIPs of the terminal device 60 and the printers 70 and the like into the printer information table 26. Generally, it is only sufficient that the intermediation server 10 acquire the information indicating the values of the network address parts of the PIPs allotted to the terminal device 60 and the printers 70 and the like.

(5) In the foregoing embodiments, the intermediation server 10 refers to the printer information table 26 shown in FIG. 9, to acquire the model name "M1" related to the PID of the specific printer 70 in S59. Alternatively, the intermediation server 10 may acquire the printer information 406 sent from the NAT router 50 in S6, and, when registering it to the printer information table 26 shown in FIG. 9, acquire the model name "M1" of the specific model 70. Generally, the intermediation server 10 may acquire the model name of the specific printer 70.

(6) In the foregoing embodiments, the intermediation server 10 determines the class of each GIP based on the value of the GIP of each of the NAT routers 50 and the like, and creates the value of the network address part of the each GIP in accordance with the class of the each GIP. Alternatively, the intermediation server 10 may further store the subnet mask for masking the GIP of each of the NAT routers 50 and the like, in the address permission table 22 (see FIG. 6), and then create the value of the network address part of each GIP based on the value of the GIP and subnet mask of each of the NAT routers 50 and the like.

(7) In the foregoing embodiments, a registration unit 30, an address acquiring unit 32, a searching unit 34, a providing unit 36, a model information acquiring unit 38, a print data creating unit 40, a print data supplying unit 42, a hierarchical relation information acquiring unit 44, and a screen data supplying unit 46 are realized as a result of the controller 16 performing the processes according to the program 20. Nevertheless, at least one unit of respective units 30 to 46 may alternately be realized by a hardware resource such as a logic circuit.

What is claimed is:

1. A printer searching device for searching for a printer that is capable of being utilized by a terminal device, the printer searching device comprising a controller configured to:
    acquire via the Internet a plurality of a first kind of global IP addresses that are allotted to a plurality of printers;
    register the plurality of the first kind of global IP addresses to a memory;
    acquire via the Internet a plurality of a first kind of information corresponding to the plurality of printers, each of the plurality of the first kind of information indicating a value of a network address part of a first kind of private IP address that is allotted to a corresponding printer;
    register the plurality of first kind of information to the memory;
    acquire via the Internet a second kind of global IP address that is allotted to the terminal device;
    acquire via the Internet a second kind of information indicating a value of a network address part of a second kind of private IP address that is allotted to the terminal device;
    search for, from the plurality of printers, one or more printers to which a value that is identical to a value of a network address part of the second kind of global IP address is allotted as a value of a network address part of the first kind of global IP address;
    search for, from the one or more printers to which the value that is identical to the value of the network address part of the second kind of global IP address is allotted as the value of the network address part of the first kind of global IP address, at least one printer to which a value that is identical to a value of the network address part of the second kind of private IP address is allotted as the value of the network address part of the first kind of private IP address; and
    provide via the Internet a search result of the at least one printer to the terminal device.

2. The printer searching device as in claim 1, wherein searching for the one or more printers includes searching for the one or more printers to which a value that is identical to an entire value of the second kind of global IP address is allotted as an entire value of the first kind of global IP address.

3. The printer searching device as in claim 1, wherein
    each of the plurality of the first kind of information includes a value of the first kind of the private IP address that is allotted to the corresponding printer and a value of a subnet mask of the corresponding printer, and
    the second kind of information includes a value of the second kind of private IP address that is allotted to the terminal device and a value of a subnet mask of the terminal device.

4. The printer searching device as in claim 1, wherein the controller is further configured to:
    acquire via the Internet model information indicating a model of a specific printer selected from the at least one printer by the terminal device;
    create, based on the model information, print data that the specific printer is capable of interpreting; and
    supply via the Internet the print data to the specific printer.

5. The printer searching device as in claim 1, wherein the printer searching device is a different device from the terminal device.

6. The printer searching device as in claim 1, wherein the controller is further configured to:
    receive an instruction from the terminal device after providing the search result to the terminal device;
    select one printer from the at least one printer in accordance with the instruction; and
    provide print data to the selected one printer.

7. A non-transitory computer readable medium storing a computer program for realizing a printer searching device configured to search a printer that is capable of being utilized by a terminal device, wherein the computer program includes instructions for ordering a computer connected with the printer searching device to:
    acquire via the Internet a plurality of a first kind of global IP addresses that are allotted to a plurality of printers;
    register the plurality of the first kind of global IP addresses to a memory;
    acquire via the Internet a plurality of a first kind of information corresponding to the plurality of printers, each of the plurality of the first kind of information indicating a value of a network address part of a first kind of private IP address that is allotted to a corresponding printer;
    register the plurality of the first kind of information to the memory;
    acquire via the Internet a second kind of global IP address that is allotted to the terminal device;
    search for, from the plurality of printers, one or more printers to which a value that is identical to a value of a network address part of the second kind of global IP address is allotted as a value of a network address part of the first kind of global IP address;
    search for, from the one or more printers to which the value that is identical to the value of the network address part of the second kind of global IP address is allotted as the value of the network address part of the first kind of global IP address, at least one printer to which a value that is identical to a value of a network address part of a second kind of private IP address is allotted as the value of the network address part of the first kind of private IP address; and
    provide a search result via the Internet of the at least one printer to the terminal device.

8. The non-transitory computer readable medium as in claim 7, wherein searching for the one or more printers includes searching for the one or more printers to which a value that is identical to an entire value of the second kind of global IP address is allotted as an entire value of the first kind of global IP address.

9. The non-transitory computer readable medium as in claim 7, wherein
    each of the plurality of the first kind of information includes a value of the first kind of the private IP address that is allotted to the corresponding printer and a value of a subnet mask of the corresponding printer, and
    the second kind of information includes a value of the second kind of private IP address that is allotted to the terminal device and a value of a subnet mask of the terminal device.

10. The non-transitory computer readable medium as in claim 7, wherein the computer program includes further instructions for ordering the computer connected with the printer searching device to:

acquire via the Internet model information indicating a model of a specific printer selected from the at least one printer by the terminal device;

create, based on the model information, print data that the specific printer is capable of interpreting; and supply via the Internet the print data to the specific printer.

11. The non-transitory computer readable medium as in claim 7, wherein the printer searching device is a different device from the terminal device.

12. The non-transitory computer readable medium as in claim 7, wherein the computer program includes further instructions for ordering the computer connected with the printer searching device to:

receive an instruction from the terminal device after providing the search result to the terminal device;

select one printer from the at least one printer in accordance with the instruction; and provide print data to the selected one printer.

13. A method for searching a printer that is capable of being utilized by a terminal device, the method comprising:

acquiring via the Internet a plurality of a first kind of global IP addresses that are allotted to a plurality of printers;

registering the plurality of the first kind of global IP addresses to a memory;

acquiring via the Internet a plurality of a first kind of information corresponding to the plurality of printers, each of the plurality of the first kind of information indicating a value of a network address part of a first kind of private IP address that is allotted to a corresponding printer;

registering the plurality of the first kind of information to the memory;

acquiring via the Internet a second kind of global IP address that is allotted to the terminal device;

searching for, from the plurality of printers, one or more printers to which a value that is identical to a value of a network address part of the second kind of global IP address is allotted as a value of a network address part of the first kind of global IP address;

searching for, from the one or more printers to which the value that is identical to the value of the network address part of the second kind of global IP address is allotted as the value of the network address part of the first kind of global IP address, at least one printer to which a value that is identical to a value of a network address part of a second kind of private IP address is allotted as the value of the network address part of the first kind of private IP address; and providing a search result via the Internet of the at least one printer to the terminal device.

14. The method as in claim 13, wherein the searching for the one or more printers includes searching for the one or more printers to which a value that is identical to an entire value of the second kind of global IP address is allotted as an entire value of the first kind of global IP address.

15. The method as in claim 13, wherein each of the plurality of the first kind of information includes a value of the first kind of the private IP address that is allotted to the corresponding printer and a value of a subnet mask of the corresponding printer; and the second kind of information includes a value of the second kind of private IP address that is allotted to the terminal device and a value of a subnet mask of the terminal device.

16. The method as in claim 13, wherein the method further comprises:

acquiring via the Internet model information indicating a model of a specific printer selected from the at least one printer by the terminal device;

creating, based on the model information, print data that the specific printer is capable of interpreting; and supplying via the Internet the print data to the specific printer.

17. The method as in claim 13, wherein the searching for the one or more printers and the searching for the at least one printer are performed by a device that is different from the terminal device.

18. The method as in claim 13, further comprising:

receiving an instruction from the terminal device after providing the search result to the terminal device;

selecting one printer from the at least one printer in accordance with the instruction; and providing print data to the selected one printer.

* * * * *